United States Patent [19]

Holley

[11] Patent Number: 5,017,124

[45] Date of Patent: May 21, 1991

[54] BIOMASS BRIQUETTER

[76] Inventor: Carl A. Holley, 14315 Tall Oaks, Riverview, Mich. 48192

[21] Appl. No.: 592,795

[22] Filed: Oct. 4, 1990

[51] Int. Cl.[5] .......... B29C 43/08

[52] U.S. Cl. .......... 425/204; 425/237; 425/DIG. 230; 264/119; 366/156

[58] Field of Search .......... 425/233, 237, 294, 308, 425/204, DIG. 230, 205, 579, 207, 200; 366/76, 155, 156, 186, 292, 318; 264/119

[56] References Cited

U.S. PATENT DOCUMENTS

| | | | |
|---|---|---|---|
| 2,514,616 | 7/1950 | Adams | 425/237 |
| 2,675,304 | 4/1954 | Komarek | 425/237 |
| 3,216,375 | 11/1965 | Ernst | 366/156 |
| 3,269,611 | 8/1966 | Komarek | 425/237 |
| 3,328,843 | 7/1967 | Murphy, Jr. et al. | 425/237 |
| 3,824,054 | 7/1974 | Harris | 425/237 |
| 3,833,327 | 9/1974 | Pitzer et al. | 425/237 |
| 4,017,241 | 4/1977 | Papinchak et al. | 425/237 |
| 4,368,165 | 1/1983 | Bergendahl | 425/237 |
| 4,411,611 | 10/1983 | Ohtawa et al. | 425/237 |
| 4,448,737 | 5/1984 | Johnson | 425/205 |

FOREIGN PATENT DOCUMENTS

| | | | |
|---|---|---|---|
| 948475 | 6/1974 | Canada | 425/237 |
| 147757 | 11/1962 | U.S.S.R. | 366/76 |
| 285875 | 3/1971 | U.S.S.R. | 366/156 |
| 912542 | 3/1982 | U.S.S.R. | 425/237 |

*Primary Examiner*—Jay H. Woo
*Assistant Examiner*—Robert B. Davis
*Attorney, Agent, or Firm*—William J. Ruano

[57] ABSTRACT

A briquetter for low density materials having a hopper, an auger in the bottom portion of the hopper extending outwardly of the hopper with its leading end feeding material conveyed by the auger and a pair of rolls receiving the feed material having briquette forming pockets extending along the roll circumferences, arranged to form complementary pockets for shaping the briquettes transversely of the rolls. A pair of confronting, threaded auxiliary ribbon flights in the hopper are provided immediately above the auger for pre-compressing material as it enters the auger. The auxiliary ribbon flights are tapered in diameter and have threads that become progressively smaller and are in opposite directions so as to concentrate pressure on material entering the auger. The leading end of the auger is smaller in diameter than the threads of the auger and is pointed to concentrate pressure on materials introduced between the pair of rolls.

3 Claims, 4 Drawing Sheets

F/G. 2

BIOMASS BRIQUETTER

BACKGROUND OF THE INVENTION

Biomass and other very light materials which have bulk densitites as low as 1 to 5 lbs./cu. ft. are impossible to briquette in conventional roll briquetters. Materials included are silica fume, fiber glass furnace dust, shredded paper, and shredded currency. These materials have a very low bulk density and the individual particle size is for some of the material is approximately one micron. In order to densify these materials they must first be deaerated so that briquettes can be formed which contain very little compressed air.

SUMMARY OF THE INVENTION

I have developed a system with a two-step deaeration and densification arrangement including a supplementary tapered ribbon flight which allows the roll briquetter to produce briquettes having a specific gravity of 1.0 to 1.3 grams per cubic centimeter, or a bulk density of 30 to 40 lbs./cu. ft.

DESCRIPTION OF THE PREFERRED EMBODIMENT

Figure 1:
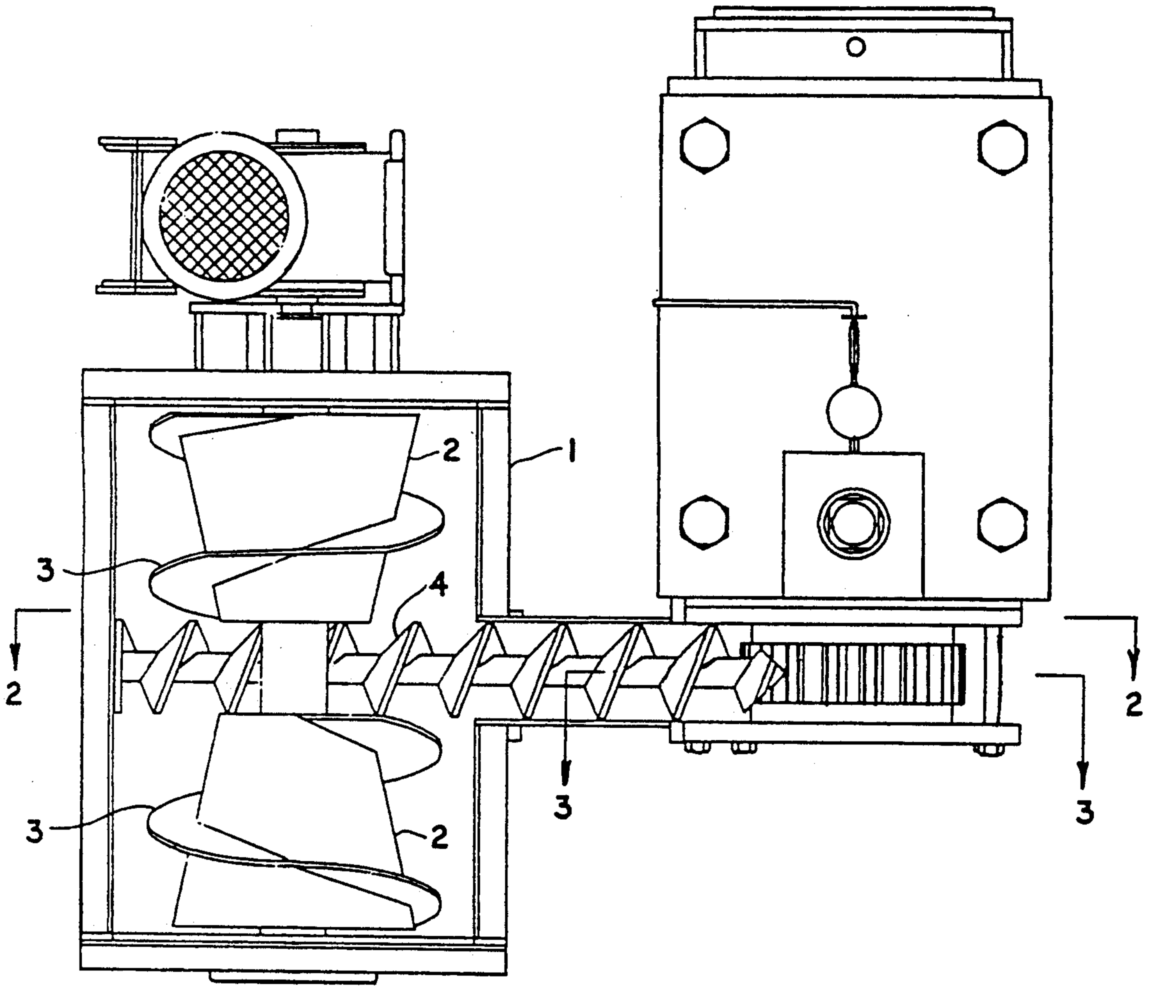
FIG. 1 shows a horizontal sectional plan view taken along line 1—1 of FIG. 2.
Figure 2:
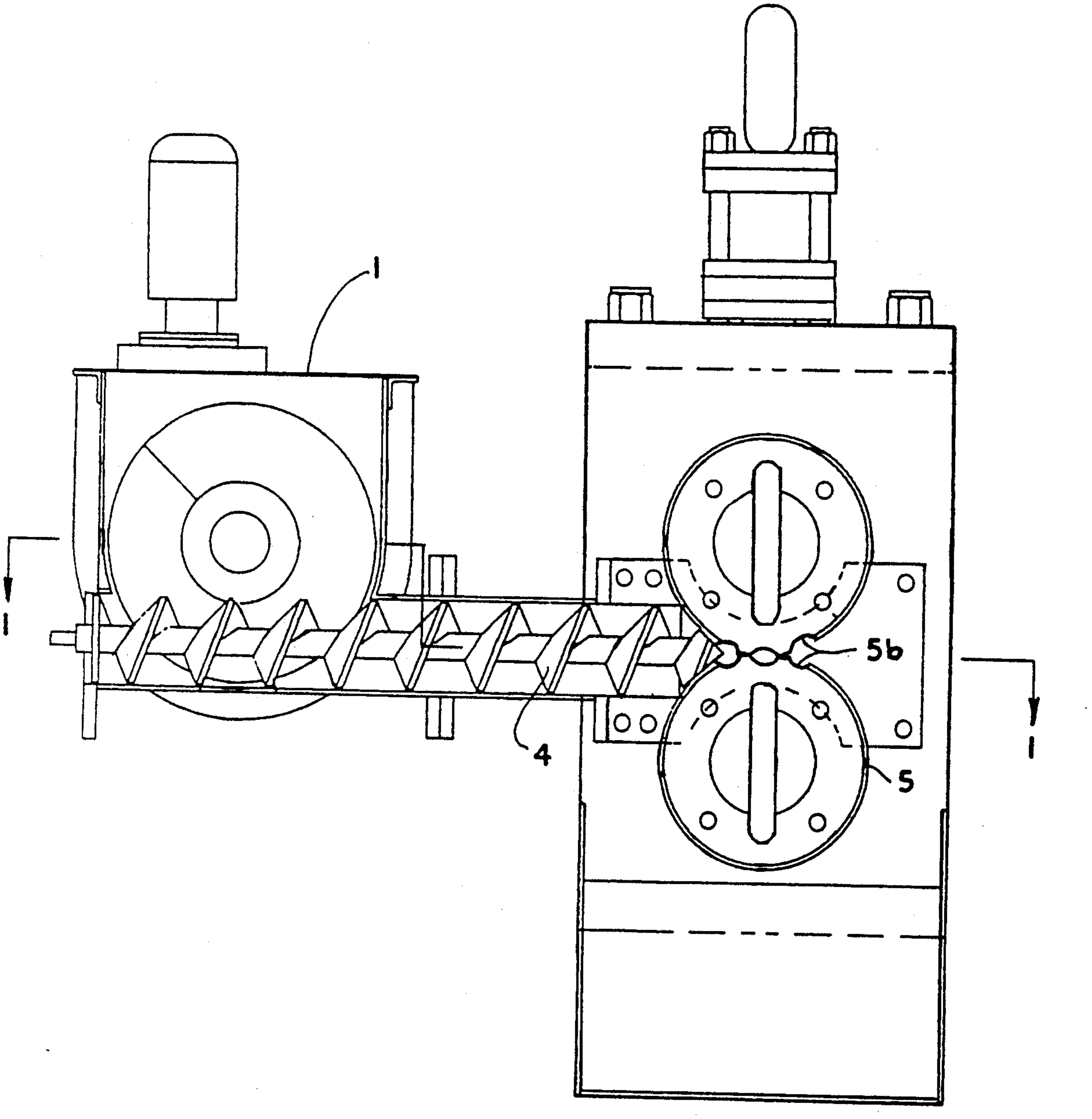
FIG. 2 is a vertical sectional view taken along line 2—2 of FIG. 1.

Referring to FIG. 1, numeral 1 denotes a hopper for downwardly feeding biomass or other light materials including silica fume, fiber glass furnace dust, shredded paper and shredded currency as well as other materials having very low bulk density and particle size of about 1 micron.

Figure 3:
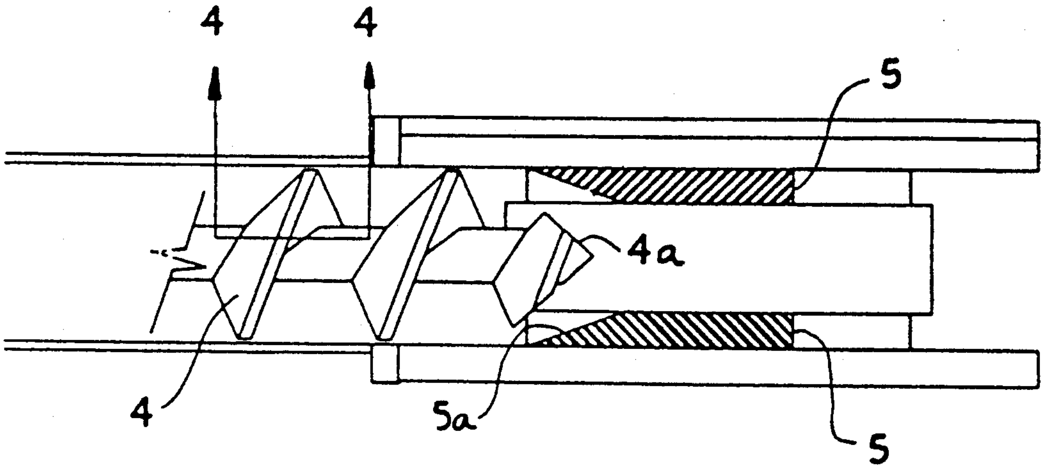
FIG. 3 is an enlarged sectional view taken along line 3—3 of FIG. 1.

Tapered auxiliary feed shafts 2,2 having threads or ribbon flights 3,3 assist in pushing the light material into the threads of auger 4 having a tapered nose section **4*a* projecting into the concave profile 5*a* of auxiliary cheek plate 5 to further compress the light material as it enters the cheek plate 5.(As shown in FIG. 3**)

Figure 4:
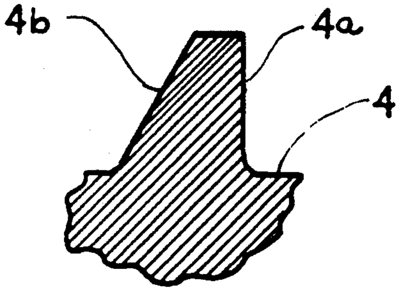
FIG. 4 is an enlarged sectional view taken along line 4—4 of FIG. 3.

FIG. 4 is an enlarged cross section of a tooth of auger 4 showing that it is vertical forwardly at **4*a* and sloped rearwardly to 4*b*** to greatly reinforce the tooth as it exerts its greatest compressive force to effect solid packing of the light material.

The ribbon flight 3 with a tapered shaft 2 may be 12"×24" in diameter and may be 36" to 60" in length. The shaft is tapered to provide a uniform feed (mass flow) from the bin or hopper 1 above the ribbon flight. The flights themselves consist of both a left and right hand section fitted on opposite sides so that the material is drawn towards the center. The flighting is also offset so that the flights terminate 180 degrees from each other about the center shaft to provide continuity of applied pressure into auger 4. This offset moves the densified material into the auger 4 smoothly without surges or "pulses" in density.

The rotational speed of the ribbon flight can be varied and is set to provide the maximum deaeration and densification of the material into the auger. The purpose of the ribbon flight is to both deaerate and also to densify the biomass as it is forced into the revolving auger 4. In some cases, the slow rolling action of the ribbon flight removes any electrical charge which may be carried by the individual particles of material. Removing these electrical charges is very important if densification is to take place. The goal is to increase the density of the biomass by 3 to 10 times in the ribbon flight.

The diameter of auger 4 can be twice the width of the working width of the rolls. The working width of the rolls 5 is based on the hydraulic pressure holding the rolls together. If this pressure is 30 tons, then the working width of the rolls can be 2" to 2.5". This is a force of 12 to 15 tons per inch of roll width.

The pitch of the auger is designed so that the rotational speed is no more than 120 R.P.M., when the material densification is enough to produce the desired briquettes at the given production rate.

The auger 4 is machined from a single bar of either **440*c* stainless steel or D-2 tool steel, in each case the flight is formed into the bar with a vertical carrying or working face 4*a* and a tapered trailing face 4*b*** which allows the auger to withstand the tremendous force generated at the rolls.

As the auger 4 nears the rolls 5, the tip or nose section **4*a* tapers down to allow the auger to end as close as possible to the pinch point where the rolls meet. This works to force the material directly into the pockets 5*b* in the rolls. The auxiliary cheek plates 5 are machined with a concave profile 5*a* at this point also to direct the material into the working section of the rolls. (FIG. 3**)

Figure 5:
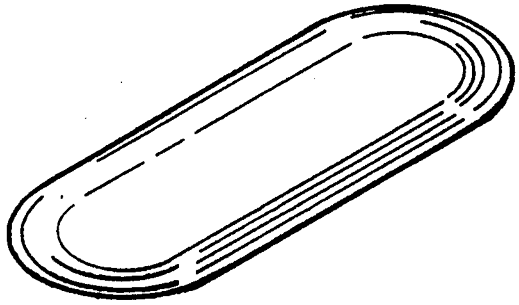
FIG. 5 is an enlarged perspective view of a resulting briquet emerging from rolls. 5.
Figure 6:
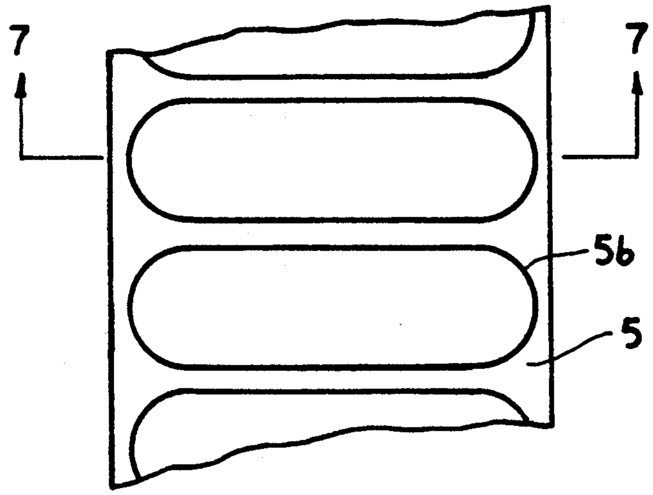
FIG. 6 is a fragmentary plan view and FIG. 7 is a vertical sectional view of a pocket **5*b***.
Figure 7:
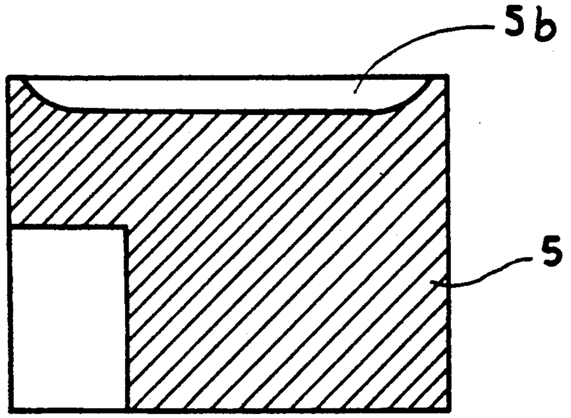

The rolls 5 themselves are designed so a to minimize the "land areas", or unused space. This concentrates more of the working pressure of the rolls into the actual formation of the briquette of compact. The pocket itself has a profile that promotes formation of the briquette and release from the pocket after formation. The pocket has a depth of ½ or less than that of a radius if it were circular to prevent sticking into the roll at the time of release. In short, the resulting briquettes from the pockets are almost flat ones having a length of almost the entire width of rolls 5, as shown in FIG. 5.

While I have illustrated and described a single specific embodiment of my invention, it will be understood that this is by way of illustration only and that various changes and modifications may be contemplated in my invention within the scope of the following claims.

I claim:

1. A briquetter for low density materials comprising a vertically extending cylindrical hopper, an auger contained centrally therein having a threaded leading portion extending outwardly at substantially right angles to said hopper, a cylinder enclosing said leading portion having an inner diameter slightly greater than said leading portion, a pair of vertically extending feed screws in said housing on opposite sides of said auger having threads tapering in the direction of said auger, a pair of rolls fed therebetween by said leading portion, said pair of rolls having briquette forming pockets extending in spaced relationship along their circumferences, arranged to form complementary pockets for shaping briquettes transversely of said rolls, said leading portion having a thread of smaller diameter than those of said leading portion and which is pointed at its forward end and which extends between said pair of rolls in close proximity to said briquette forming pockets to concentrate pressure on low density materials entering said pockets.

2. A briquetter as recited in claim 1 together with a pair of cylindrical cheek plates on the inner surfaces of said pair of rolls, which check plates are tapered in the direction of said leading portion for receiving, in the tapered portion, said thread of smaller diameter to concentrate pressure on low density material as it enters said cheek plates.

3. A briquetter as recited in claim 1 wherein the threads of said feed screws are left and right hand threads which are offset 180° from each other to provide continuity of applied pressure to low density material entering said auger.

* * * * *